(12) United States Patent
Wang

(10) Patent No.: US 6,282,426 B1
(45) Date of Patent: Aug. 28, 2001

(54) METHOD, AND ASSOCIATED APPARATUS, FOR DETERMINING GEOGRAPHIC POSITIONING OF A WIRELESS COMMUNICATION STATION OPERABLE IN A NON-IDEAL PROPAGATION ENVIRONMENT

(75) Inventor: Shu-Shaw Wang, Arlington, TX (US)

(73) Assignee: Nokia Mobile Phones Limited, Espo (FI)

( * ) Notice: Subject to any disclaimer, the term of this patent is extended or adjusted under 35 U.S.C. 154(b) by 0 days.

(21) Appl. No.: 09/327,848

(22) Filed: Jun. 8, 1999

(51) Int. Cl.[7] ....................................... H04Q 7/20
(52) U.S. Cl. .................. 455/456; 342/450; 342/451; 342/453
(58) Field of Search ................... 455/456, 457; 342/357.06, 450, 452, 453, 451, 464

(56) References Cited

U.S. PATENT DOCUMENTS 6,026,304 * 2/2000 Hilsenrath et al. ................. 455/456
6,148,211 * 11/2000 Reed et al. ........................ 455/456
6,161,018 * 12/2000 Reed et al. ........................ 455/456

\* cited by examiner

Primary Examiner—Lee Nguyen
(74) Attorney, Agent, or Firm—Federico Fraccarol

(57) ABSTRACT

Apparatus, and an associated method, for determining the geographical positioning of a wireless communication station when the wireless communication station is operated in a non-ideal propagation environment. Errors introduced by NLOS conditions in a determination of a position of the wireless communication station calculated by way of a trilateration technique are corrected. If too few signals are received at the wireless communication station to permit a determination of its position using a ray tracing pattern recognition technique, an estimate of the position of the wireless communication station is also determinable. When implemented in a cellular communication system, accurate position determinations are made even when the mobile station is operated in a non-ideal propagation environment, such as an urban area.

20 Claims, 10 Drawing Sheets

| COLUMN I | COLUMN II |
|---|---|
| 1. PREDICTION LOCATION 1 (BASED ON LOS CALCULATIONS) | 1. PREDICTION LOCATION 1 (TAKING INTO ACCOUNT TOPOGRAPHICAL FEATURES) |
| ... | ... |
| N. PREDICTED LOCATION N | N. PREDICTED LOCATION N |

FIG. 6

METHOD, AND ASSOCIATED APPARATUS, FOR DETERMINING GEOGRAPHIC POSITIONING OF A WIRELESS COMMUNICATION STATION OPERABLE IN A NON-IDEAL PROPAGATION ENVIRONMENT

The present invention relates generally to a manner by which to determine the geographic positioning of a wireless communication station, such as a cellular mobile station. More particularly, the present invention relates to apparatus, and associated methodology, by which to determine the geographic positioning of the wireless communication station when the wireless communication station is operated using TOA- (time-of-arrival) signaling in a non-ideal propagation environment. Accurate determination of the location at which a wireless communication station is positioned is determinable, for instance, when the wireless station is operated in an NLOS (non-line-of-sight) condition, or in situations in which fewer than three TOA-signals are detected at the wireless station.

BACKGROUND OF THE INVENTION

Advancements in communication technologies have permitted the implementation of mobile communication systems, such as a cellular communication system. Telephonic communication, of both voice and data, is generally possible through the use of a mobile communication system.

Communication by way of a mobile communication system is advantageous as communications can be effectuated by way of a mobile station carryable by a user. Improved mobility of communications is possible as a wireline connection is not required to form a communication link.

Telephonic communications effectuated by use of a cellular communication system, as well as various other types of mobile communication systems, appear to a user generally to be similar to those effectuated by way of a conventional, wireline telephonic network.

However, the mobile nature of a mobile communication system prevents simple tracking of the location at which a call is placed, such as a call for emergency assistance by a user of a mobile station operable in such a system.

When a call is originated at a conventional wireline device, the geographical position from which the call is originated is easily determinable. A simple mapping between the telephonic identity of the originating, wireline device and the location at which the device is installed, indicates the geographical positioning of the originating party. In contrast, because of the inherent mobility permitted of a mobile station, a subscriber of a mobile station is able to originate a call with the mobile station at almost any location within a geographical area encompassed by the cellular communication system. The geographical position at which the call is originated is, therefore, not easily determinable. Determination of the location at which a call is originated is vitally important, for instance, in a request for emergency assistance. If a request for emergency assistance is made by way of a mobile station and the originating party is unable to indicate to emergency personnel the location from which the request for emergency assistance is made, delivery of the emergency assistance might be, at the least, delayed.

Proposals have been set forth to overcome this shortcoming of use of a radio communication system. One such proposal makes use of GPS (global positioning system) technologies. GPS receivers are available to receive and detect TOA- (time-of-arrival) signals generated by satellite based transmitters (the "satellites"). Three signals received from three separate satellites at a GPS receiver are used by the GPS receiver to determine an accurate 3D (three dimensional) geographic positioning of the GPS receiver if the GPS receiver is synchronized to the satellites. Incorporation of GPS receiver circuitry in a mobile station permits the geographical positioning of the mobile station to be determinable. And, such incorporation, is proposed to overcome the inability to automatically determine the physical positioning of a mobile station.

Accurate position determination utilizing GPS techniques, however, requires the detection of three separate TOA-signals delivered directly, i.e., by line-of-sight from the three satellite-based, or other, transmitters. The GPS receiver, or mobile station incorporating circuitry capable of detecting TOA-signals, such as those generated by satellite-based transmitters, might be positioned at a location, or otherwise be operated in a non-ideal propagation environment, in which three line-of-sight TOA-signals cannot be detected. For instance, in an urban area, topographical features, such as building structures, might prevent line-of-sight detection of a TOA-signal. Instead, only non-line-of-sight (NLOS) detection might be possible. Also, only two TOA-signals, or perhaps only a single TOA-signal, might be detectable. Conventional GPS techniques do not compensate for NLOS conditions, or for the determination of a location fix if only two TOA-signals are detectable.

A manner by which to determine the geographical position of a wireless communication station when operated in a non-ideal propagation environment would be advantageous.

It is in light of this background information related to determination of geographic positioning of a wireless communication station that the significant improvements of the present invention have evolved.

SUMMARY OF THE INVENTION

The present invention, accordingly, advantageously provides apparatus, and an associated methodology, by which to determine the geographical positioning of a wireless communication station, such as a cellular mobile station, even when the communication station is operated in a non-ideal propagation environment.

Operation of an embodiment of the present invention permits accurate determination of the location at which a wireless communication station is positioned, even when the communication station is positioned in a non-ideal propagation environment, such as that which sometimes exists in an urban area.

In one implementation, the wireless communication station forms a mobile station, such as a mobile station operable in a cellular communication system. TOA (time-of-arrival) signals, such as those generated in a GPS (global positioning system), or a radio base station operable in a cellular communication system, are detectable by the mobile station. Such TOA-signals are utilized to determine the geographical positioning of the mobile station.

When three separate TOA-signals are delivered to the mobile station by line-of-sight (LOS) transmission by a TOA-signal sending station determination of the mobile station is accurately determinable utilizing conventional trilateration techniques. However, use of conventional trilateration techniques does not provide an entirely accurate determination of the geographical positioning of the mobile station in the event that the mobile station is cause to be operated in a non-ideal propagation environment.

Operation of an embodiment of the present invention permits more accurate determinations to be made of the geographical positioning of the mobile station when the mobile station is operated in a non-ideal propagation environment.

In one aspect of the present invention, an accurate determination of the geographical positioning of a wireless communication station is made even if one or more of three TOA-signals are delivered to the mobile station by a non-line-of-sight (NLOS) delivery. NLOS delivery of the TOA-signals might occur, for instance, when the communication station is positioned in an urban area, and a building is positioned between the TOA-signal sending station and the wireless communication station to block a direct, LOS transmission of the TOA-signals. Compensation is made for range residue, i.e., error caused by NLOS delivery of the TOA-signals, thereby to provide an accurate indication of the geographical positioning of the wireless communication station.

In one implementation, a location fix is calculated in conventional manner at the wireless communication station. Indications of the calculated location fix are provided to a location computing station. When implemented in a cellular communication system, indications of the location fix are calculated at the mobile station and transmitted to network infrastructure. A location computing station at the network infrastructure associates the area surrounding the location fix with a topographical map indicating the topographical features positioned about the calculated location fix. Simulated ray traces are created to extend between the TOA-signal sending stations and various positions located at grid points. Values associated with the simulated ray paths are used to form a correction table, and the correction table is utilized to correct an error in the calculated location fix caused by NLOS transmission of the TOA-signals. In another implementation, a location fix is also calculated at the wireless communication station. Responsive to the location fix calculated by the wireless station, data pertaining to, and forming, a topographical map is sent to the wireless station. The functions of a location computing station, i.e., ray tracing, database formation, and position determining, are performed at the wireless station.

In another implementation of the present invention, determination of the geographical positioning of a wireless communication station, again, such as the aforementioned mobile station operable in a cellular communication system is made even if only two TOA-signals, are detected at the communication station. Geographical positioning determination is also possible if only a single TOA-signal is detected. When, for instance, the wireless communication station is positioned in an urban area, topographical features might substantially entirely block transmission of TOA-signals generated by TOA-signal sending stations to prevent their detection at the wireless communication station. If fewer than three TOA-signals are detected at the wireless communication station, conventional trilateration techniques cannot be utilized to determine the geographical positioning of the wireless communication station. The cell or sector in which the mobile station is located is initially used to define the zonal portion in which the wireless communication station is located. Thereafter ray-tracing is performed to simulate ray paths from the TOA-signal sending station, or stations if two TOA-signals are detectable, capable of transmitting a TOA-signal through the general area, i.e., the "sector," in which the wireless communication station is determined to be located. Values representative of the simulated ray paths are stored in a location database. A determination of the actual location at which the LOS communication station is positioned is determined therefrom. In one implementation, the actual location of the wireless communication station is selected based upon a minimum difference between values contained in the actually received signals at the communication station and values of the simulated ray paths.

Thereby, through operation of an embodiment of the present invention, an accurate determination is made of the actual position at which a wireless communication station is located. When at least three TOA-signals are detected at the wireless communication station, correction is made for errors contained in conventional calculations due to NLOS transmission of TOA-signals. And, when fewer than three TOA-signals are detected at the wireless communication station, a determination of the position at which the wireless communication station is communicated is still able to be calculated.

In these and other aspects, therefore, apparatus, and associated methodology, determines geographic positioning of a mobile station operable in a radio communication system installed to encompass a geographical area. The mobile station receives at least a first TOA- (time-of-arrival) signal generated by first TOA-signal source. A zonal position determiner is coupled to receive indications of at least information related to the at least the first TOA-signal received at the mobile station. The zonal position determiner determines a zonal portion of the geographical area encompassed by the radio communication system in which the mobile station is positioned. A ray tracer is operable responsive to determinations made by the zonal portion determiner of the zonal portion in which the mobile station is positioned. The ray tracer simulates ray paths from each of the at least first TOA-signal source. A mobile station position determiner is coupled to receive values representative of the simulated ray paths generated by the ray tracer. The mobile station position determiner determines an actual position of the mobile station responsive to the values representative of the simulated ray paths.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 6 illustrates a table, values of which are generated during operation of an embodiment of the present invention.

DETAILED DESCRIPTION OF THE PREFERRED EMBODIMENT

Figure 1:
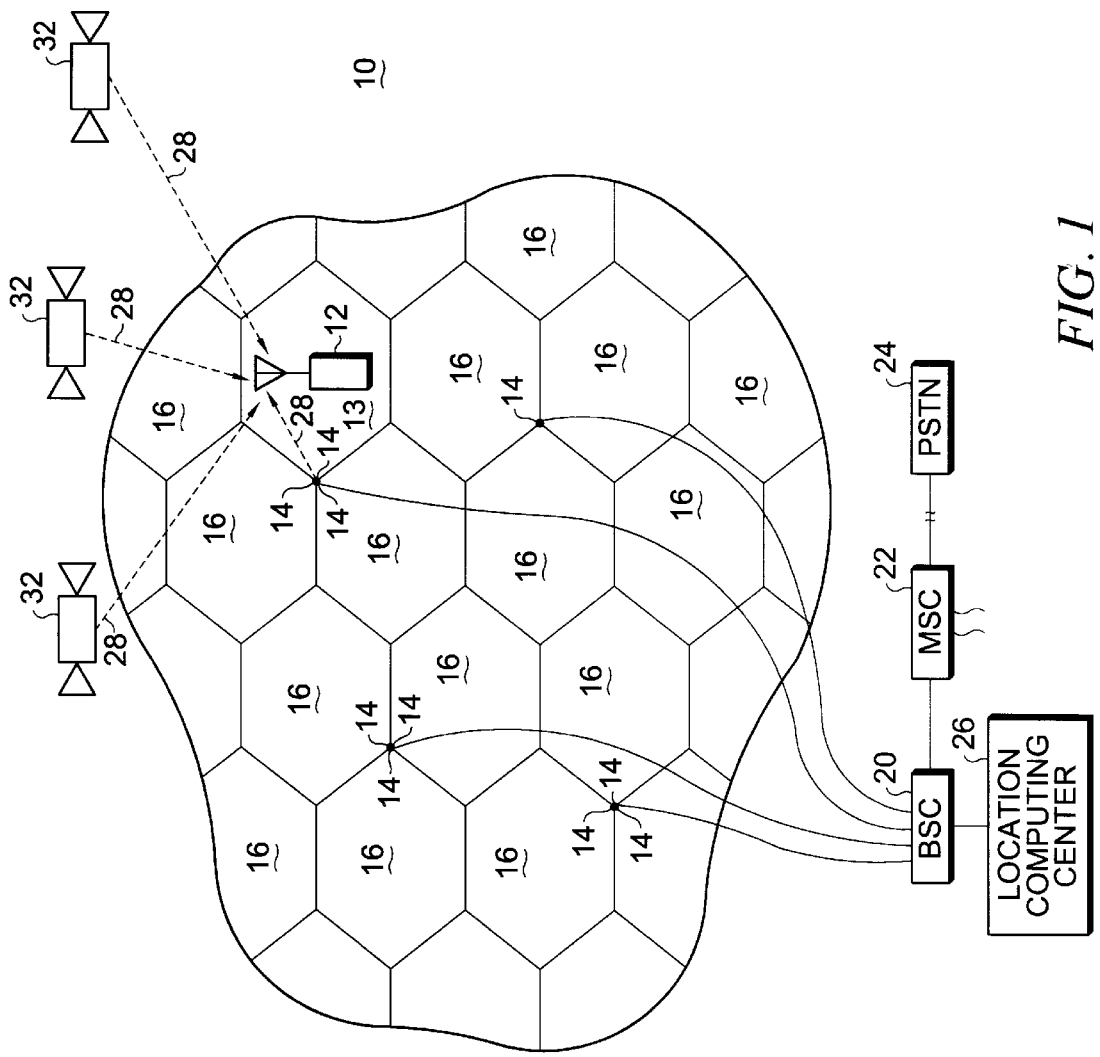
FIG. 1 illustrates a representation of a portion of a cellular communication system, together with satellite-spaced transmitters, such as those utilized in a GPS (global positioning system).

Turning first to FIG. 1, radio communication system, shown generally at 10, is operable to permit wireless communications with a mobile station 12. In the exemplary implementation shown in the Figure, the radio communication system is formed of a cellular communication system constructed according to any of the various standards promulgated by a standards-creating body. Operation of an embodiment of the present invention shall be described with respect to such a cellular communication system. In other implementations, though, other embodiments of the present invention are analogously operable in other communication systems to determine accurately the geographical positioning of a wireless communication station even when the communication station is caused to be operated in a non-ideal propagation environment.

The cellular communication system of which the radio communication system 10 is representative includes a network infrastructure having a plurality of spaced-apart radio base stations 14 positioned at spaced intervals throughout a geographical area encompassed by the communication system. The radio base stations are fixed-site radio transceivers capable of multi-user communications. In the exemplary implementation shown in the Figure, groups of three radio base stations 14 are co-located. Each radio base station 14 forms a sector cell 16. For purposes of illustration, cells 16 are represented to be of hexagonal configurations.

Groups of the radio base stations 14 are coupled to a BSC (base station controller) 20 of which a single BSC 20 is shown in the Figure. A BSC is operable to control operation of the radio base stations coupled thereto. Groups of the BSCs are coupled to an MSC (mobile switching center) 22, of which a single MSC 22 is shown in the Figure. An MSC is operable, amongst other things, to perform switching operations. The MSC 22 is coupled to a PSTN (public-switched telephonic network) 24.

A location computing center 26 is here coupled to the BSC 20. The location computing center 26 is, for instance, connected to an emergency response center, such as a center at which, in the United States, emergency 911 calls are directed. In an alternate arrangement, and as shall be described below, the functions of the location computing center are performed at the mobile stations 12.

As noted above, unlike conventional wireline devices, the position of a wireless communication station, such as the mobile station 12, is not automatically known when a call originated thereat is terminated at a location computing center. To provide the location computing center 26 with geographical positioning information of the location at which the mobile station 12 originates a call, such as a request for emergency assistance, proposals have been set forth to include GPS (global positioning system) circuitry at the mobile station. GPS circuitry is operable to receive TOA-signals 28, such as those generated by satellite-transmitters 32.

When three or more TOA-signals 28 are detected at the mobile station, the geographical positioning of the mobile station is determinable by a conventional trilateration technique. However, accurate determination of the geographical positioning of the mobile station utilizing a conventional trilateration technique requires that the TOA-signals 28 be transmitted to the mobile station in line-of-sight (LOS) fashion. If a topographical feature obstructs LOS transmission so that only non-line of-sight (NLOS) transmission to the mobile station is permitted, errors are introduced into the determined geographical positioning of the mobile station.

Also, if fewer than three, i.e., one or two, TOA-signals 28 are detectable by the mobile station, determination of the geographical position of the mobile station utilizing trilateration techniques is not possible. Operation of an embodiment of the present invention also permits accurate determination of the geographical positioning of the mobile station even when only two TOA-signals are detected at the mobile station.

Because of the ability to determine accurately the geographical positioning of the mobile station when the mobile station is caused to be operated in non-ideal propagation environments, emergency, or other, personnel are able to be provided with the geographical positioning from which a call for emergency, or other, assistance is made.

Figure 2:
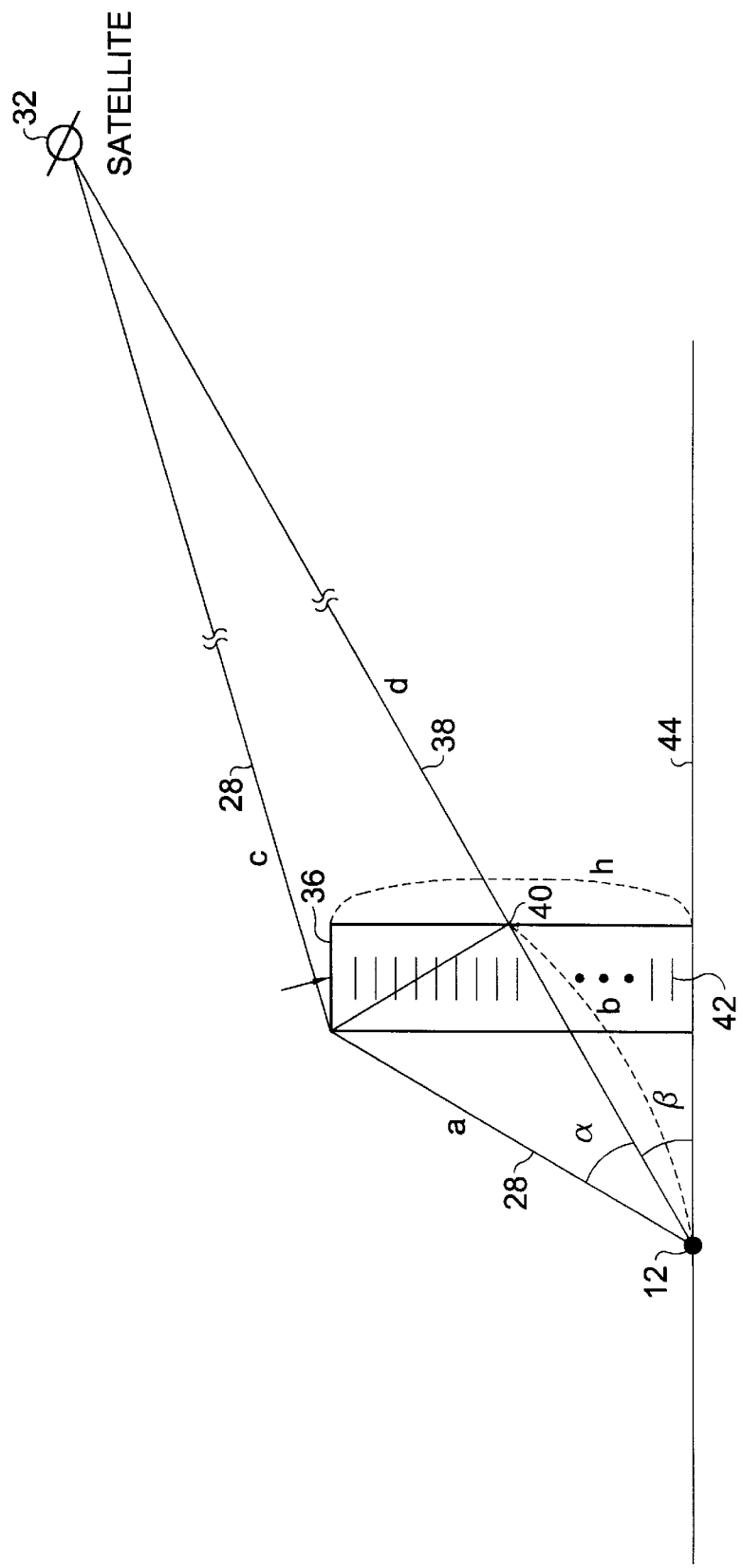
FIG. 2 illustrates NLOS (non-line-of-sight) transmission of a TOA (time-of-arrival) signal which, when utilized by conventional position determining apparatus, causes erroneous determinations of positions, and of which error resulting therefrom is compensated during operation of an embodiment of the present invention.

FIG. 2 illustrates an NLOS condition in which a TOA-signal 28 transmitted by satellite-transmitter 32 cannot be directly communicated to a mobile station 12 in an LOS transmission. Here, a multi-story building 36 forms a topographical feature which obstructs the LOS transmission, here indicated by the line 38 of the TOA-signal generated by the satellite-transmitter 32. The multi-story building 36 includes a plurality of floors 42 and is of a height "h.". The figure illustrates the geometrical relationship between the NLOS, TOA-signal 28, and the LOS transmission 38 of the TOA-signal. From this geometrical relationship, the range residue representative of distortion caused by NLOS transmission of the TOA-signal and the is determined and error resulting therefrom is compensated.

Here, the TOA-signal 28 is represented by line segments "a" and "c." The line segment "c" defines the transmission path of a TOA-signal extending between the satellite-transmitter 32 and a top-edge corner portion of the multi-story building 36. And, the line segment "a" defines the path extending between the top-edge corner portion of the building and the mobile station 12. Analogously, the transmission path 38 representing a LOS transmission of the TOA-signal is formed of line segments "b" and "d." The line segment "d" extends between the satellite-transmitter and a right angle basis 40. The line segment "b" extends between the right angle basis 40 and the mobile station 12. Because the building forms an obstruction, the line segment "b" is not representative of actual transmission of a TOA-signal. Also, the angle $\beta$ is defined to extend between a planer, ground surface 44 and the line segment "b." The angle $\alpha$ is defined as the angle extending between the line segment "b" and the line segment "a." By assuming that the lengths of the line segments "c" and "d" are much greater than the length of the line segment "a", and also by assuming that the lengths of the line segments "c" and "d" are substantially equal to one another, the range residue is defined as follows:

Assume c>>a and c=d

Range Residue=$a-b=[h/\sin(\alpha+\beta)]\cdot(1-\cos\alpha)$

Analysis of the equation that the range residue is related to the height, h, of the multi-story building, and is also related to the angle between the diffraction edge and the planer ground surface 44 and the angle between the satellite-transmitter and the planer ground surface. The range residue degrades the accuracy of determinations of the position of the mobile station utilizing a conventional trilateration technique.

Figure 3A:
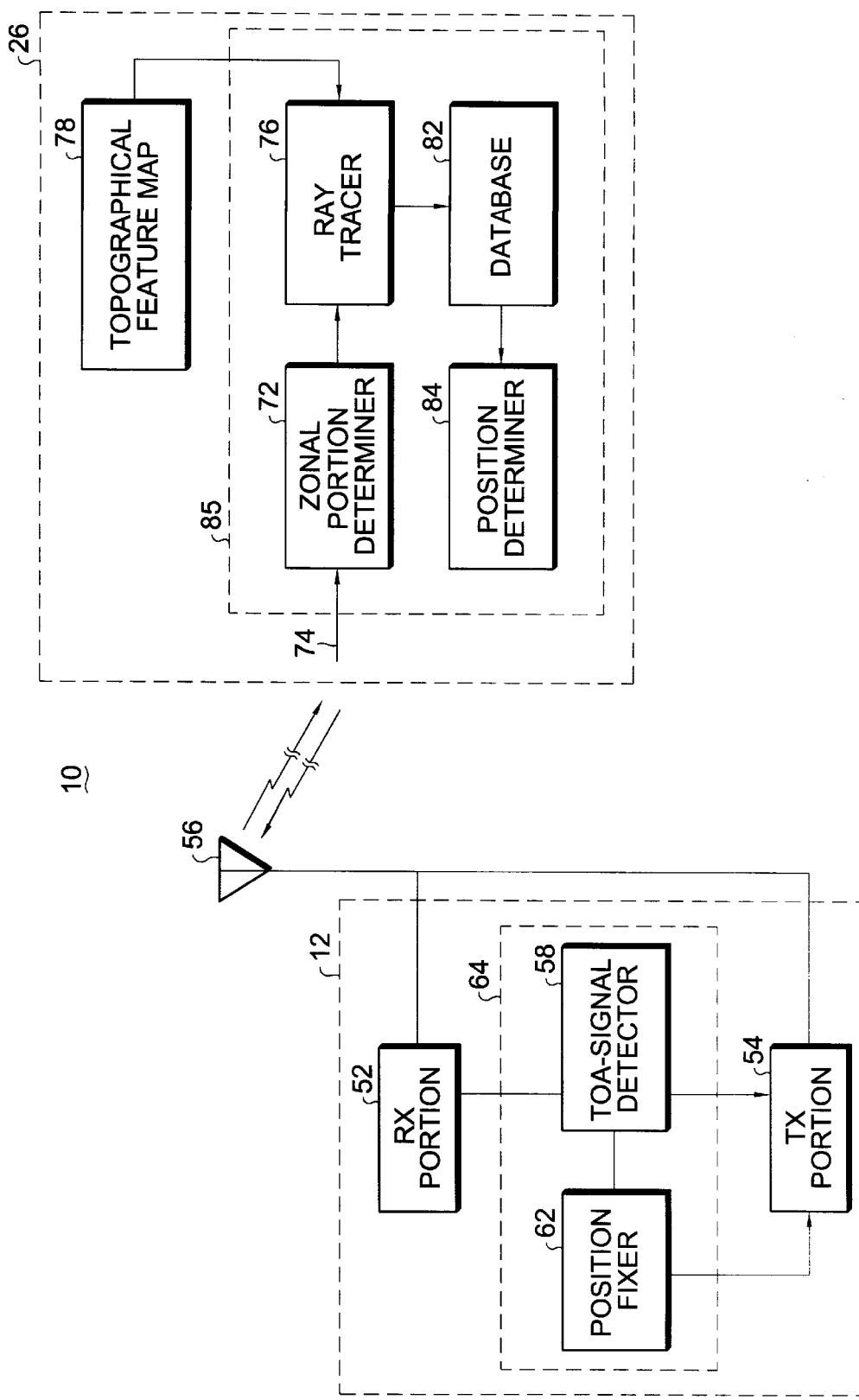
FIG. 3A illustrates portions of the mobile station and network infrastructure shown previously in FIG. 1 and forming an embodiment of the present invention.

FIG. 3A illustrates portions of the radio communication system 10, shown previously in FIG. 1. The mobile station 12 is again shown as is also the location computing center 26, shown in FIG. 1 to be coupled to the PSTN 24. As noted above, the mobile station 12 includes TOA-signal detecting circuitry operable, in conventional manner, to determine the position of the mobile station utilizing a trilateration technique. The mobile station is here shown to include both receiver circuitry forming a receive portion 52 and transmitter circuitry forming a transmit portion 54. The receive and transmit portions 52 and 54 are coupled to an antenna transducer 56. The receiver circuitry of the receive portion 52 is of characteristics permitting reception of both radio signals generated by radio base stations 14 (shown in FIG. 1) and also signals generated by satellite-transmitters 32 (also shown in FIG. 1).

Information contained in the TOA-signals detected by the receive portion 52 are provided to a TOA-signal detector 58, represented as a functional element in the Figure. When at least three TOA-signals are detected at the mobile station, trilateration techniques can be performed at the mobile station to provide a position fix indicating the position at which the mobile station is located. In the Figure, a functional element forming a position fixer 62 is coupled to the TOA-signal detector 58 and is operable to calculate a position fix of the mobile station by a trilateration technique. In one implementation, the detector 58 and the position fixer 62 form portions of a controller 64 and are implemented as algorithms executable by the controller.

The position fixer 62 and the detector 58 are coupled to the transmit portion 54 of the mobile station. Position fixes determined by the position fixer 62 are provided to the transmit portion to be transmitted by the mobile station to the network infrastructure and routed to the location computing center 26.

If the propagation environment in which the mobile station is situated permits detection of fewer than three TOA-signals, trilateration techniques cannot be performed to obtain a position fix of the mobile station. In such an occurrence, information contained in the TOA-signal, or signals, which are detected at the mobile station 12 are provided by the TOA-signal detector to the transmit portion 54 of the mobile station. The information is also transmitted by the mobile station over a radio link to the network infrastructure of the communication system and then routed to the computing center 26.

The location computing center is coupled to receive information transmitted thereto by the mobile station. In one implementation, the location computing center is connected to an emergency assistance staging area, such as a staging area at which emergency requests, such as "911" calls, are routed. When a call is originated at the mobile station, either values representative of a position fix determined at the mobile station or values of the TOA-signals detected at the mobile station are transmitted to the location computing center 26.

The computing center 26 is shown to include a zonal portion determiner 72. The zonal portion determiner is coupled to receive indications of the values generated by the position fixers 62 and TOA-signal detector 58 and transmitted by the transmit portion 54 of the mobile station. Such indications are here represented to be applied to the zonal portion determiner 72 by way of the line 74. The zonal portion determiner 72 is represented as a functional element, as are other elements shown to form the location computing center. In an actual implementation, the functions performed by the zonal portion determiner are carried out by execution of appropriate algorithms at a processing device.

As shall be noted below, the zonal portion determiner is operable, responsive to the indications supplied thereto by way of the line 74, to determine a zonal portion of the geographical area encompassed by the radio communication system in which the mobile station is most likely to be positioned. If, for instance, indications of a position fix are provided to the determiner, a location zone centered at the position fix forms the zonal portion. If, a position fix cannot be determined at the mobile station utilizing trilateration techniques, the zonal portion is defined by the cell, sector, or other area in which a TOA-signal detected at the mobile station is known to be transmittable.

The location computing center 26 further includes a ray tracer 76. The ray tracer 76 is represented as a functional element. The ray tracer is operable to simulate ray paths between TOA-signal sources and selected positions within the zonal portion determined by the determiner 72. The simulated ray paths formed by the ray tracer include both LOS (line-of-sight) paths and also simulated ray paths taking into account topographical features within the zonal portion. The topographical features are stored at a storage location forming a topographical feature map 78, and relevant portions of the topographical feature map associated with the zonal portion determined by the determiner are provided to the ray tracer. NLOS (non-line-of-sight) ray paths are therefrom simulated by the ray tracer.

The location computing center 26 further includes a data base 82 coupled to receive values representative of the simulated ray paths calculated by the ray tracer 76. The data base includes values representative of both the LOS simulated ray paths and, if appropriate, also the NLOS, simulated ray paths. A mobile station position determiner 84 is coupled to the data base 82 to permit values stored at the data base to be retrieved. The mobile station position determiner is operable, responsive to such stored information to determine the position of the mobile station. Error introduced by the imperfect propagation environment in which the mobile station might be positioned is corrected at the location computing center. The zonal portion determiner 72, ray tracer 76, database 82, and position determiner 84 together form a location computer 85.

Figure 3B:
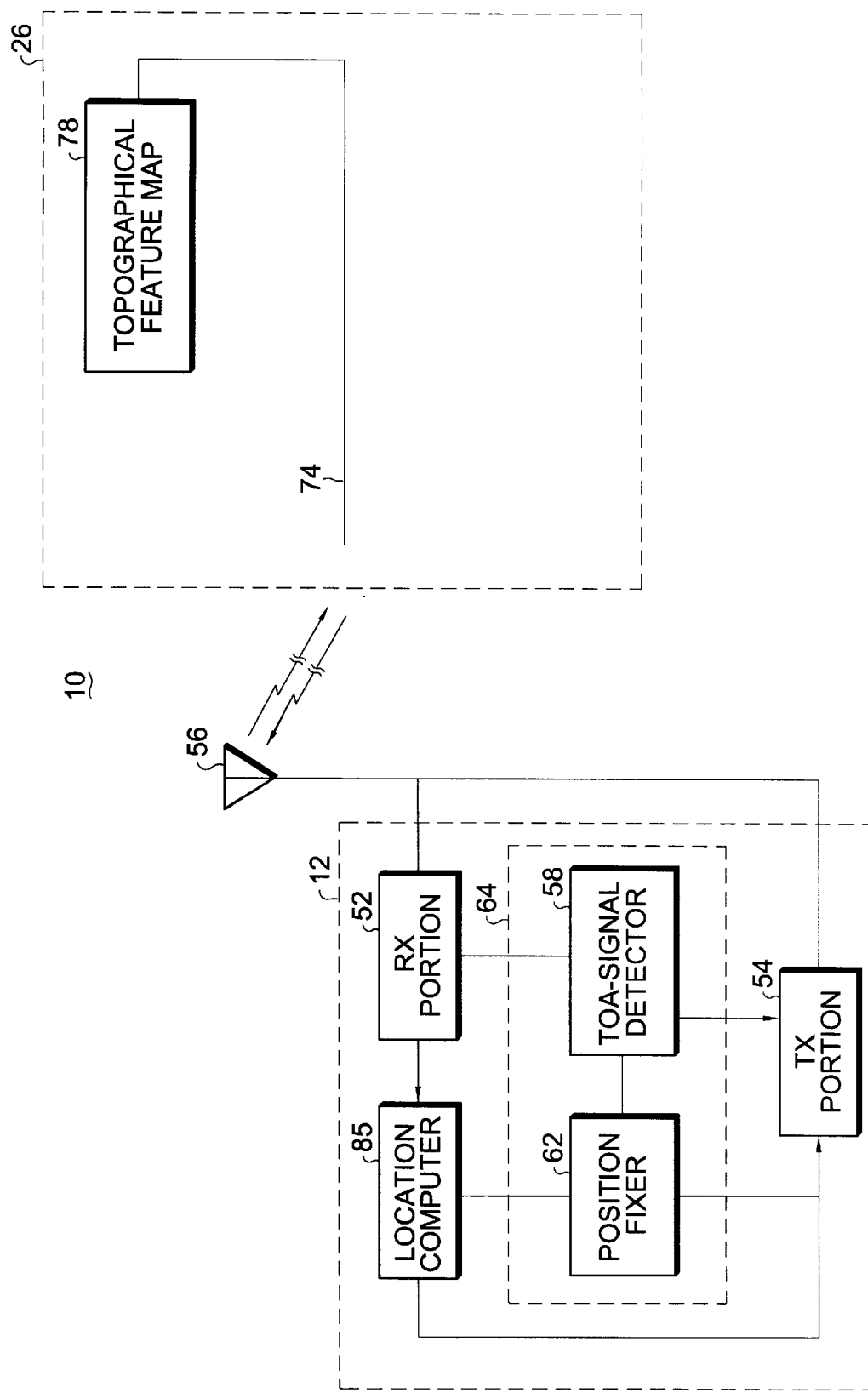
FIG. 3B illustrates portions of the mobile station and network infrastructure analogous to that shown in FIG. 3A, but of another embodiment of the present invention.

FIG. 3B also illustrates portions of the radio communication system 10, analogous to the illustration shown in FIG. 3A. FIG. 3B illustrates an alternate embodiment of the present invention. Structure shown previously in FIG. 3A is commonly-referenced, and shall not be described again in detail. In the embodiment shown in FIG. 3B, the functions performed by the location computer 85 are performed at the mobile station 12 rather than at the location computing center. Operation culminating in determination of positioning of the mobile station is correspondingly altered. The TOA-signal detector 58 and position fixer 62 are operable as above-described. Information, either position fixes determined by the position fixer 62 or information pertaining to the TOA-signal, or signals, detected by the detector 58 are transmitted by the mobile station over a radio-link to the network infrastructure of the communication system and then routed to the computing center 26. Data stored at the topographical feature map 78, in this embodiment, is accessed therefrom. And, data forming a topographical map, is sent over the radio-link to the mobile station. Such data is utilized by the location computer 85, also as above-described, to determine the location of the mobile station.

Figure 4:
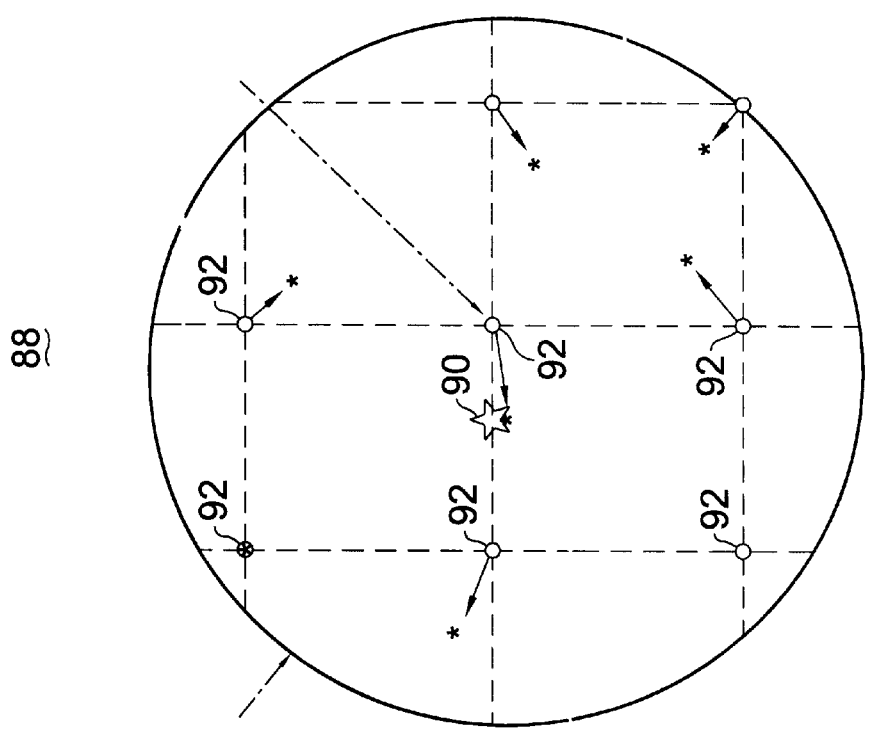
FIG. 4 illustrates a location zone determined during operation of an embodiment of the present invention.

FIG. 4 illustrates a location zone 88 determined by the zonal portion determiner, shown in FIG. 3, during operation of an embodiment of the present invention. When at least three TOA-signals are detected at a mobile station, and a raw position fix is determined at the mobile station, indications of the position fix are provided to the zonal portion determiner. The location zone 88 determined by the determiner 72 is centered about the position fix, shown at 90. The determiner further defines a plurality of grid points 92 within the location zone. The grid points define end points of the simulated ray paths created by the ray tracer 76. LOS ray paths, for instance, are formed between each TOA-signal sending station and each of the end points 92 formed of the grid points. Values representative of the simulated ray paths are stored at the data base 82.

Figure 5:
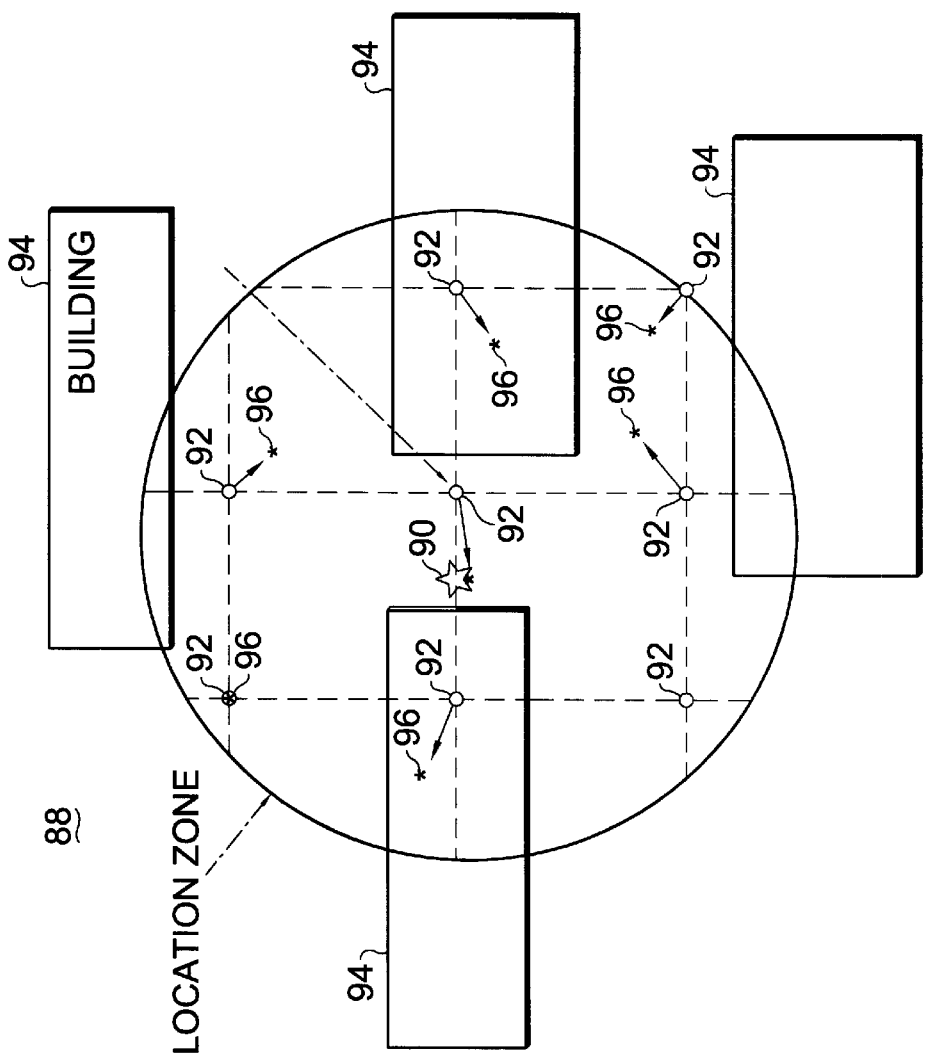
FIG. 5 illustrates the location zone shown in FIG. 4, together with topographical features overlaid thereon.

FIG. 5 illustrates the same location zone shown in FIG. 4, determined by the zonal position determiner 72 during operation of an embodiment of the present invention. The topographical features, here buildings 94, are retrieved from the topographical feature map 78 (shown in FIG. 3) and overlaid upon the location zone. The ray tracer simulates ray paths between the end points formed of the grid points 92, and TOA-signal sources. When the topographical features are overlaid upon the location zone, some of the simulated ray paths include NLOS transmission paths. As the ray paths are simulated, range residues, defined above with respect to FIG. 2, are also determined. Predicted locations of each of the end points taking into account the calculated range residues, are formed. Such predicted locations for each of the end points are indicated at 96 in the Figure. In the event that no topographical features introduce range residue, the predicted locations 96 of the end points correspond with the end points 92.

FIG. 6 illustrates a table of which the data base 82 is formed during operation of an embodiment of the present invention. The table 98 includes a first column 102 and a second column 104. The first column is formed of values representative of predicted locations based on LOS calculations, such as those described with respect to FIG. 4 above. And, the second column 104 is formed of values of predicted locations taking into account topographical features, as described with respect to FIG. 5. In the event that the mobile station is positioned at a LOS position, viz., NLOS conditions do not introduce range residue, the values contained in the respective columns 102 and 104 correspond and there is no offset between the position fix determined at the mobile station and the actual position of the mobile station. If, however, an NLOS condition is present, the values are dissimilar. The position determiner 84 (shown in FIG. 3) performs such difference calculations, and the differences therebetween forms an offset which is used to correct the measured position fix. For example, in FIG. 5, if the measured location is at point 90, the corrected mobile location is at the mobile location 92.

Figure 7:
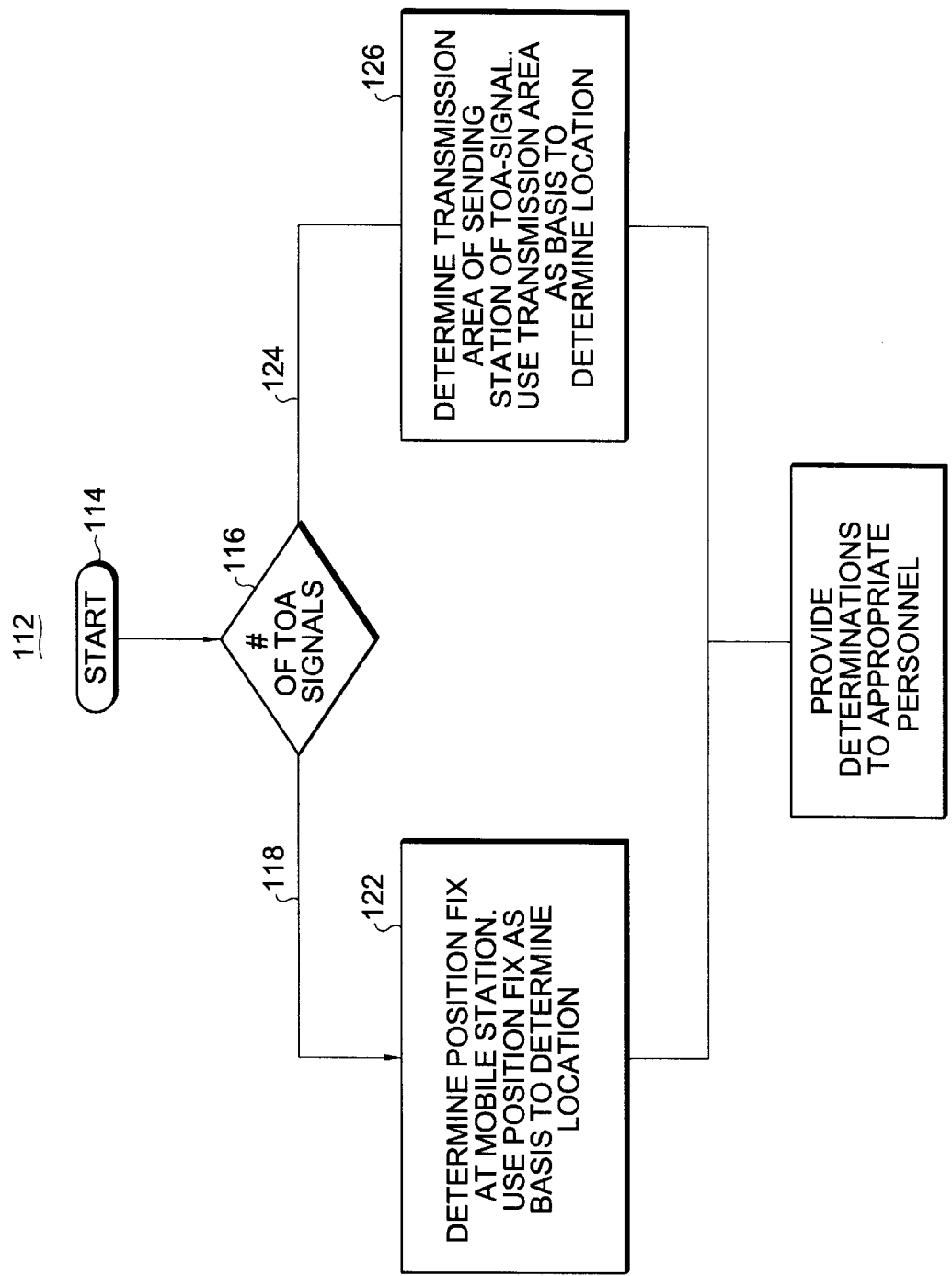
FIG. 7 illustrates a method by which ah embodiment of the present invention is operable.

FIG. 7 illustrates a method, shown generally at 112, representative of operation of the location computing center 26 (shown in FIG. 3) during operation of an embodiment of the present invention. After entry into the method, indicated by the start block 114, a determination is made at the decision block 116 whether three, or fewer than three, TOA-signals are detected at the mobile station. If at least three TOA-signals are detected at the mobile station, the branch 118 is taken to the block 122 whereat a position fix determined by the mobile station provides a basis from which to determine the actual position of the mobile station. Additional details of the method 122 shall be described below with respect to FIG. 8. If, conversely, fewer than three TOA-signals are detected at the mobile station, the branch 124 is taken to the method block 126. As a position fix cannot be determined utilizing a trilateration technique, determination of the geographical positioning of the mobile station at the method block 126 is made upon the basis of knowing the transmission area of the sending station which transmits a TOA-signal detected by the mobile station. Additional details with respect to the method of operation of the method 126 shall be described below with respect to FIG. 9. Once the geographical positioning of the mobile station is determined, either at the method blocks 122 or 126, indications of such determinations are provided, at the block 128 to appropriate personnel.

Figure 8:
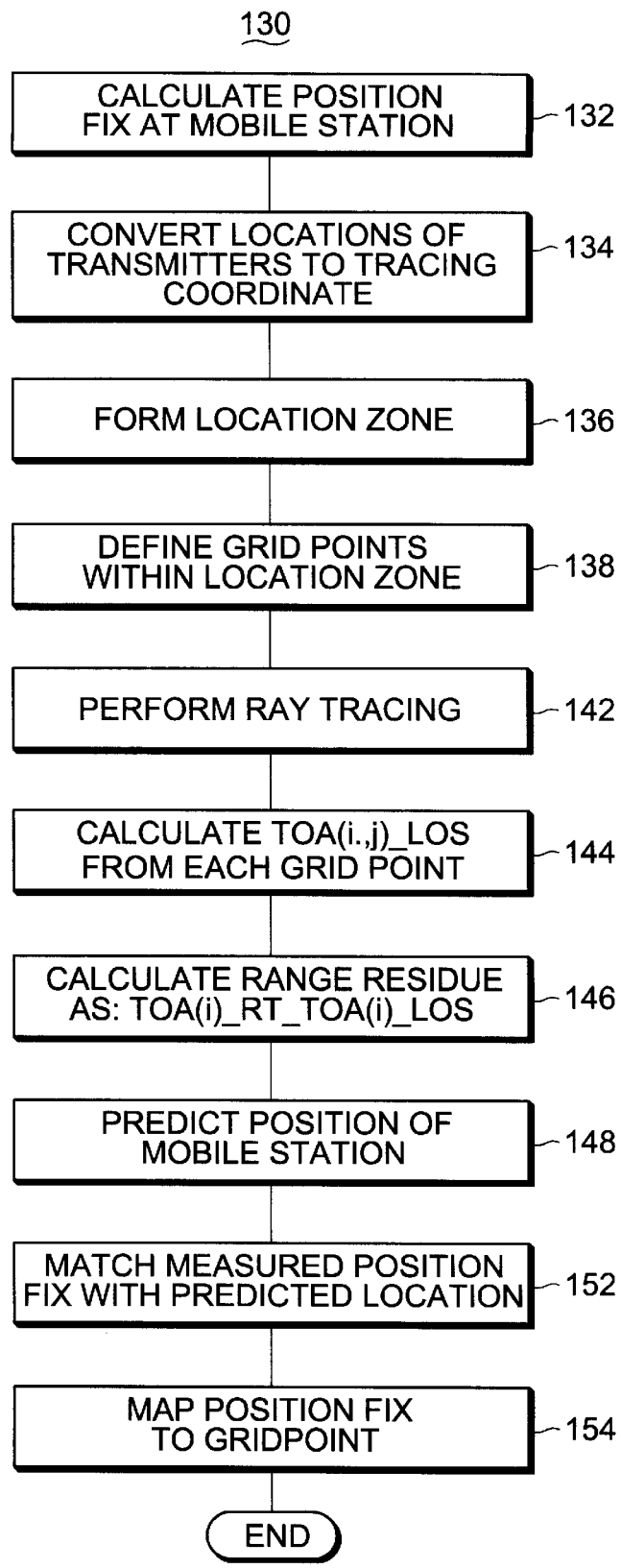
FIG. 8 illustrates the method by which the position of a wireless communication station is determined during operation of an embodiment of the present invention when three TOA-signals are detected at a wireless communication station.

FIG. 8 illustrates the method 122 by which the actual position of a mobile station is determined when at least three TOA-signals are detected at a mobile station. First, and as indicated by the block 132, a raw position fix, calculated at the mobile station using trilateration techniques is determined. Then, and as indicated by the block 134, the locations of the transmitters from which the TOA-signals originate are converted into a tracing coordinate. When the TOA-signal sources are formed of satellite-transmitters of a GPS, or formed of a base station transmission, the AZ/EL locations are converted into the ray-tracing coordinates.

Then, and as indicated by the block 136, a location zone, centered at the raw position fix is formed. Also, grid points, e.g., 2 m by 2 m points are defined within the location zone, as indicated by the block 138.

Then, and as indicated by the block 142, ray-tracing is performed to find TOA(i,j)_RT from each grid point to every sending station, where i is the number of grid points and j is the number of sending stations. And, as indicated by the block 144, the TOA(i,j)_LOS is calculated from each grid point to every visible sending station without accounting for topographical features which might be located in the location zone.

Then, and as indicated by the block 146, a range residue (i) vector is calculated to be [TOA(i)_RT]–[TOA(i)_LOS]. Then, and as indicated by the block 148, a predicted position of the mobile station is calculated including NLOS effects at each of the grid points.

Thereafter, and as indicated by the block 152, the measured, i.e., raw, position fix is matched to a closest predicted mobile station location. And, as is indicated by the block 154, the position fix is mapped to a corresponding grid point to correct for range residue caused by NLOS error.

Figure 9:
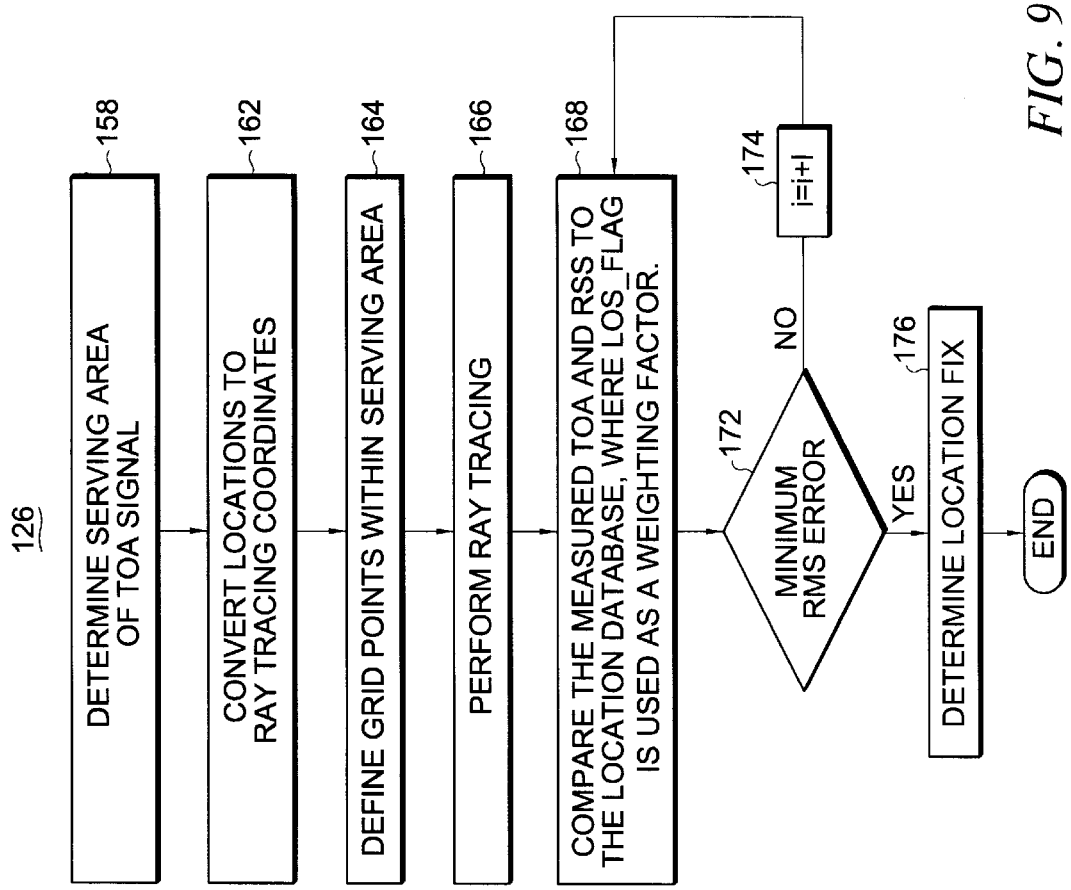
FIG. 9 illustrates the method of operation of an embodiment of the present invention to determine the geographic positioning of a wireless communication station when only two TOA-signals are detected at the station.

FIG. 9 illustrates the method 126 by which the geographical positioning of a mobile station is determined when only one or two TOA-signals are detected at a mobile station. First, and as indicated by the block 158, a serving area associated with one of the TOA-signals, or if only one, then the TOA-signal, such as a serving area of a radio base station is determined and its associated serving area is masked. Then, and as indicated by the block 162, signal locations are converted to ray-tracing coordinates. For instance, if a TOA-signal source is formed of a GPS transmitter, the satellite AZ/EL locations are converted to ray-tracing coordinates.

Then, and as indicated by the block 164, a plurality of grid points, e.g., a 5 m by 5 m array, are defined in the masked area. Then, and as indicated by the block 166, ray-tracing is performed between signal sources and grid points. TOA(i), RSS(i), and LOS_flag(i) for each of the simulated ray paths are stored at a location data base, where i is the grid point.

At the block 168, the measured TOA and RSS values are compared with values stored at the location data base. LOS_flag is used as a weighting factor. Thereafter, and as indicated by the decision block 172, a determination is made as to whether the comparison for a grid point i is a minimum value. If not, then the NO branch is taken to the increment block 174 and a subsequent comparison is made. If, however, a comparison results in a minimum RSS error, a YES branch is taken to the block 176 whereat a location fix is determined.

Through operation of an embodiment of the present invention, error in calculating the geographical positioning of a mobile station due to positioning of the mobile station in a non-ideal propagation environment is overcome. Errors introduced by range residue are overcome and, if fewer than three TOA-signals are detected at the mobile station, the geographical positioning of the mobile station is still able to be determined.

The previous descriptions are of preferred examples for implementing the invention and the scope of the invention should not necessarily be limited by this description. The scope of the present invention is defined by the following claims.

What is claimed is:

1. Apparatus for determining geographic positioning of a mobile station operable in a radio communication system installed to encompass a geographical area and in which the mobile station receives at least a first TOA (time-of-arrival) signal generated by a first TOA-signal-source, said apparatus comprising:
   a zonal portion determiner coupled to receive indications of at least information related to the first TOA-signal received at the mobile station, said zonal portion determiner for determining a zonal portion of the geographical area encompassed by the radio communication system in which the mobile station is positioned;
   a ray tracer operable responsive to determinations made by said zonal portion determiner of the zonal portion in which the mobile station is positioned, said ray tracer for simulating ray paths from each of the at least first TOA-signal source; and
   a mobile station position determiner coupled to receive values representative of simulated ray paths generated by said ray tracer, said mobile station position determiner for determining an actual position of the mobile station responsive to the values representative of the simulated ray paths.

2. The apparatus of claim 1 further comprising a database storage element, said database storage element coupled to receive values representative of simulated ray paths generated by said ray tracer, the values stored at storage locations of said database storage element forming a database of values, and wherein said mobile station position determiner is coupled to receive the values stored at said database storage element.

3. The apparatus of claim 2 wherein the mobile station receives the first TOA-signal, wherein the indications to which said zonal position determiner is coupled to receive, comprise indications of a coverage area of the first TOA-signal source, respectively.

4. The apparatus of claim 3 wherein the zonal portion of the geographical area in which the mobile station is determined by said zonal portion determiner to be positioned comprises the coverage area of the first TOA-signal source.

5. The apparatus of claim 4 wherein said zonal portion determiner further defines grid points at selected positions within the coverage area.

6. The apparatus of claim 5 wherein the ray paths simulated by said ray tracer simulate paths of rays extending between each of the at least first TOA-signal source and each grid point defined by said zonal portion determiner.

7. The apparatus of claim 6 wherein the paths of rays simulated by said ray tracer are represented by values, the values forming a location database, and the values used to define predicted locations of the mobile station.

8. The apparatus of claim 7 wherein said mobile station position determiner is coupled to receive the values stored at the location database, and wherein the actual position of the mobile station is determined responsive to comparisons between selected values stored at the location database and corresponding values derived from the at least the first TOA-signal.

9. The apparatus of claim 1 wherein the at least first TOA-signal comprises the first TOA-signal, a second TOA-signal, and at least a third TOA-signal, wherein the mobile station further includes a location fix positioner operable responsive to the first, second, and third TOA-signals, respectively, to generate a location fix indicative of a location-fix-positioner determined location of the mobile station and wherein the indications, to which said zonal portion determiner is coupled to receive, comprise indications of the location fix.

10. The apparatus of claim 9 wherein the zonal portion of the geographical area in which the mobile station is determined by said zonal portion determiner to be positioned comprises a location zone centered at the location fix.

11. The apparatus of claim 10 wherein said zonal portion determiner further defines grid points at selected positions within the location zone.

12. The apparatus of claim 11 wherein the geographical area further comprises topographical features having height-wise dimensions and wherein said zonal portion determiner further associates the height-wise dimensions of the topographical features with the location zone.

13. The apparatus of claim 12 wherein, when a selected position at which said zonal portion determiner defines grid points corresponds with a topographical feature having a height-wise dimension, said zonal portion determiner defines the grid point thereat to include at least one height-wise dimension.

14. The apparatus of claim 13 wherein the topographical feature having the height-wise dimension comprises a multi-level construction and wherein the at least one height-wise dimension of the grid point comprises a height-wise dimension associated with each level of the multi-level construction.

15. The apparatus of claim 11 wherein the ray paths simulated by said ray tracer simulate paths of rays extending between each TOA-signal source and each grid point defined by said zonal portion determiner.

16. The apparatus of claim 15 wherein the paths of rays simulated by said ray tracer are represented by values, the values forming a correction table, and the values used to define predicted locations of the location fix.

17. The apparatus of claim 16 wherein said mobile station position determiner determines the actual position of the mobile station by matching the location fixed with values taken from the correction table associated with a predicted location of the predicted locations positioned most closely to the location fix.

18. A method for determining geographic positioning of a mobile station operable in a radio communication system installed to encompass a geographic area in which the mobile station receives at least a first TOA(time-of-arrival) signal generated by a first TOA-signal source, said method comprising:
- selecting a zonal portion of the geographical area encompassed by the radio communication system in which the mobile station is positioned representative to the indications of at least information related to the at least the first TOA-signal;
- simulating ray paths from each of the at least the first TOA-signal source, responsive to determinations made during said operation of selecting; and
- determining an actual position of the mobile station responsive to values representative of the simulated ray paths.

19. The method of claim 18 comprising an initial operation of detecting how many of the at least the first TOA-signal are received at the mobile station; and, if at least three TOA-signals are received at the mobile station further performing the operation of calculating a location fix at the mobile station, the location fix forming the indications responsive to which the zonal portion is selected during said operation of selecting.

20. The method of claim 19, if fewer than three TOA-signals are received at the mobile station, further comprising performing the operation of determining a coverage area of the first TOA-signal source, the coverage area forming the indications responsive to which the zonal portion is selected during said operation of selecting.

* * * * *